(12) United States Patent
Urino

(10) Patent No.: US 8,676,017 B2
(45) Date of Patent: Mar. 18, 2014

(54) LIGHT CONTROL ELEMENT AND OPTICAL WAVEGUIDE CIRCUIT

(75) Inventor: Yutaka Urino, Tokyo (JP)

(73) Assignee: NEC Corporation, Tokyo (JP)

( * ) Notice: Subject to any disclaimer, the term of this patent is extended or adjusted under 35 U.S.C. 154(b) by 529 days.

(21) Appl. No.: 12/999,991

(22) PCT Filed: May 14, 2009

(86) PCT No.: PCT/JP2009/002120
§ 371 (c)(1),
(2), (4) Date: Dec. 17, 2010

(87) PCT Pub. No.: WO2009/157128
PCT Pub. Date: Dec. 30, 2009

(65) Prior Publication Data
US 2011/0097030 A1    Apr. 28, 2011

(30) Foreign Application Priority Data
Jun. 26, 2008   (JP) ................................. 2008-166997

(51) Int. Cl.
*G02B 6/10* (2006.01)
*G02B 6/26* (2006.01)

(52) U.S. Cl.
USPC ................................. 385/131; 385/3; 385/14

(58) Field of Classification Search
None
See application file for complete search history.

(56) References Cited

U.S. PATENT DOCUMENTS

2004/0208454 A1 * 10/2004 Montgomery et al. ......... 385/50
2005/0179986 A1    8/2005 Gothoskar et al.

FOREIGN PATENT DOCUMENTS

| JP | 3-196120 A | 8/1991 |
| JP | 2002540469 A | 11/2002 |
| JP | 2006515082 A | 5/2006 |
| JP | 2006343412 A | 12/2006 |
| JP | 2007625711 A | 9/2007 |

* cited by examiner

*Primary Examiner* — Tina Wong
(74) *Attorney, Agent, or Firm* — Sughrue Mion, PLLC

(57) ABSTRACT

A light control element includes three or more silicon thin-film layers (522, 524, 526) placed on a first dielectric layer (521), second dielectric layers (523, 525) placed between the three or more silicon thin-film layers (522, 524, 526), and a third dielectric layer (529) placed to surround the silicon thin-film layers and the second dielectric layers. The three or more silicon thin-film layers are arranged to partially overlap with one anther. In the part where the silicon thin-film layers overlap, the second dielectric layers are placed between the silicon thin-film layers. In the three or more silicon thin-film layers, the silicon thin-film layers adjacent to each other have different conductivity types.

20 Claims, 6 Drawing Sheets

LIGHT CONTROL ELEMENT AND OPTICAL WAVEGUIDE CIRCUIT

This application is the National Phase of PCT/JP2009/002120, filed May 14, 2009, which is based upon and claims the benefit of priority from Japanese patent application No. 2008-166997, filed on Jun. 26, 2008, the disclosure if which is incorporated herein in its entirety by reference.

TECHNICAL FIELD

The present invention relates to a light control element and an optical waveguide circuit and, particularly, to a light control element such as an optical modulator, an optical switch, a variable optical attenuator or a tunable filter used for optical fiber communications, optical interconnection, optical signal processing and so on, and an optical waveguide circuit.

BACKGROUND ART

In the fields of optical fiber communications, optical interconnection, optical signal processing and so on, an optical modulator that converts an electrical signal into an optical signal, an optical switch that controls a path and intensity of an optical signal, a variable optical attenuator, a tunable filter and the like are important functions. Such functions can be implemented by a planar optical waveguide circuit. For example, a Mach-Zehnder interferometer, a ring resonator or the like is made with a planar optical waveguide. Then, a refractive index in the interferometer or the resonator is controlled to change the state of interference or resonance. Consequently, it is known that it is possible to control the intensity or propagation direction of output light and thereby implement the-above functions.

For example, for transmission with a bit rate of 10 Gbps or more in long-distance optical fiber communications, a Mach-Zehnder interferometer type optical modulator using a lithium niobate optical waveguide is widely used. However, because the Mach-Zehnder interferometer type optical modulator using the lithium niobate optical waveguide has an element size of as large as several centimeters and requires a drive voltage of as high as several volts, there are issues such as that a dedicated driver circuit is necessary, integration with another optical element is difficult, and costs are high.

Recently, for improvement on the above issues regarding the lithium niobate optical modulator, development and commercialization of an optical modulator using a silicon optical waveguide are in progress (Patent Literatures 1 to 3). The silicon optical waveguide has a stronger action to confine light inside the waveguide than the lithium niobate optical waveguide. It thus has features such as capability to reduce an element size, to lower a drive voltage, to provide integration with another optical element or an electronic circuit, and to realize higher productivity and lower costs with use of LSI manufacturing resources.

As an example of the silicon optical modulator, FIG. 9 shows a schematic cross sectional structure of the optical modulator disclosed in FIG. 9 of Patent Literature 1. FIG. 9 shows an optical waveguide in a refractive index control part of the optical modulator. The cross sectional structure of the optical waveguide includes a silicon substrate 10, a buried oxide layer 11, a relatively thin submicron surface silicon layer 12, a gate dielectric layer 13, a relatively thin polysilicon gate layer 14, and a superposed dielectric layer 19. A part of the surface silicon layer 12 and a part of the polysilicon gate layer 14 are arranged to overlap with the gate dielectric layer 13 interposed therebetween. The surface silicon layer 12 is doped into p-type and the polysilicon gate layer 14 is doped into n-type, so that they make a MOS structure. Regions 212 and 214 are respectively formed in the surface silicon layer 12 and the polysilicon gate layer 14. The regions 212 and 214 are high concentration doped regions which are doped with a high concentration to establish electrical connection with the outside. The regions 212 and 214 are respectively placed at positions apart from the area where the surface silicon layer 12 and the polysilicon gate layer 14 overlap. Further, a region of the surface silicon layer 12 near the gate dielectric layer 13 is a region 112, and a region of the polysilicon gate layer 14 near the gate dielectric layer 13 is a region 114. The region 112 and the region 114 serve as carrier modulation regions where the carrier density varies.

The refractive index of the surface silicon layer 12 and the polysilicon gate layer 14 is about 3.5. Further, the refractive index of the buried oxide layer 11 and the superposed dielectric layer (typically, a silicon oxide film is used) 19 is about 1.45. Thus, light is confined in a region 101 near the part where the surface silicon layer 12 and the polysilicon gate layer 14 overlap and propagates in a direction perpendicular to the paper. When a voltage is applied between the region 212 of the surface silicon layer 12 and the region 214 of the polysilicon gate layer 14, free carriers (electrons or holes) are accumulated or depleted in the region 112 and the region 114 depending on the orientation of the voltage. The variation in the carrier density changes a refractive index by the carrier plasma effect, thereby modulating the phase of the light propagating through the region 101.

CITATION LIST

Patent Literature

[Patent Literature 1]
Published Japanese Translation of PCT International Publication for Patent Application, No. 2006-515082
[Patent Literature 2]
Japanese Unexamined Patent Application Publication No. 2006-343412
[Patent Literature 3]
Published Japanese Translation of PCT International Publication for Patent Application, No. 2007-525711

SUMMARY OF INVENTION

Technical Problem

In the silicon optical modulator disclosed in Patent Literature 1, regions where the refractive index changes due to the variation of the free carrier density are limited to the region 112 of the surface silicon layer 12 and the region 114 of the polysilicon gate layer 14. Specifically, the refractive index changes only in the region 112 of the surface silicon layer 12 in close proximity to the gate dielectric layer 13. Further, the refractive index changes only in the region 114 of the polysilicon gate layer 14 in close proximity to the gate dielectric layer 13. On the other hand, the electric field distribution of light is over the region 101. Therefore, the overlap of the refractive index modulation region and the electric field distribution of light is small, leading to an issue that the modulation efficiency is low.

If the modulation efficiency is low, it raises issues such as that a light propagation distance necessary for obtaining a desired phase shift amount is long and accordingly the size of the optical control element increases, that a high voltage is necessary and accordingly a particular driver circuit is required, and that power consumption increases. Note that, if the thickness of the surface silicon layer 12 and the polysilicon gate layer 14 is reduced to be substantially equal to the thickness at which carriers are accumulated or depleted, the refractive index can be changed all over the thickness of the surface silicon layer 12 and the polysilicon gate layer 14. However, the thickness at which carriers are accumulated or depleted is thinner than the thickness at which light is confined in the silicon. If the surface silicon layer 12 and the polysilicon gate layer 14 get thinner, confinement of light in the thickness direction is weakened. The light thereby leaks to the buried oxide layer 11 and the superposed dielectric layer 19. Therefore, the overlap of the refractive index modulation region and the electric field distribution of light becomes small. Further, if the surface silicon layer 12 and the polysilicon gate layer 14 get thinner, the electrical resistance of the surface silicon layer 12 and the polysilicon gate layer 14 in the cross direction increases, which raises an issue that the speed of response decreases.

The present invention has been accomplished in view of the above issues and it is desirable to provide a small size and high performance light control element and an optical waveguide circuit.

Solution to Problem

A light control element according to the present invention includes a first dielectric layer placed on a substrate, three or more silicon thin-film layers placed on the first dielectric layer, a second dielectric layer placed between the three or more silicon thin-film layers, and a third dielectric layer placed to surround the silicon thin-film layers and the second dielectric layer. The three or more silicon thin-film layers are arranged to partially overlap with one another. Further, the second dielectric layer is arranged between the silicon thin-film layers in a part where the silicon thin-film layers overlap. In the three or more silicon thin-film layers, the silicon thin-film layers adjacent to each other have different conductivity types.

Advantageous Effects of Invention

According to the present invention, it is possible to provide a small size and high performance light control element and an optical waveguide circuit.

DESCRIPTION OF EMBODIMENTS

Figure 1:
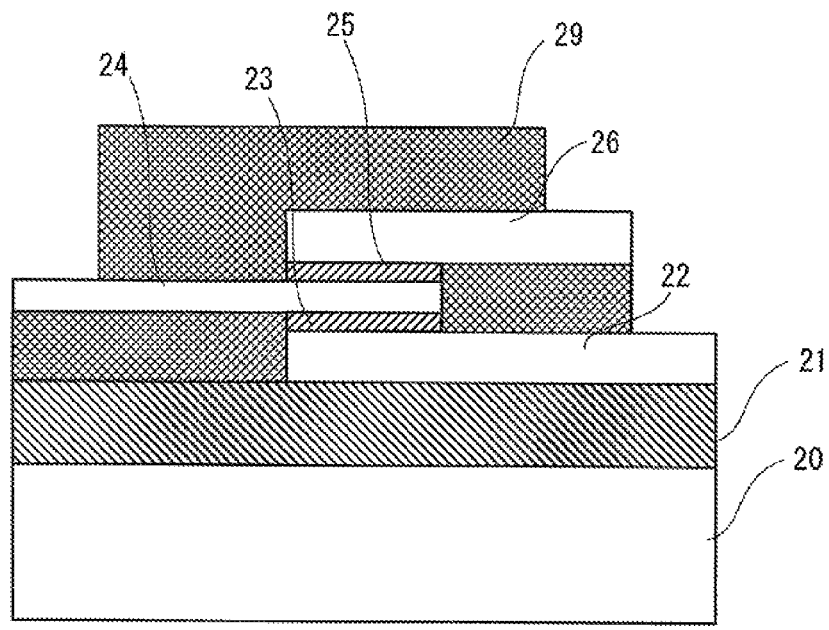
FIG. 1 is a cross sectional view showing a structure of a light control element according to the present invention.

A light control element according to the present invention is described with reference to FIG. 1. FIG. 1 is a cross sectional view showing a structure of the light control element. The light control element includes a first dielectric layer 21 placed on a substrate 20, three or more silicon thin-film layers 22, 24 and 26 placed on the first dielectric layer 21, second dielectric layers 23 and 25 placed between the three or more silicon thin-film layers 22, 24 and 26, and a third dielectric layer 29 placed to surround the silicon thin-film layers and the second dielectric layers. The three or more silicon thin-film layers 22, 24 and 26 are arranged to partially overlap with one another. In the part where the silicon thin-film layers 22, 24 and 26 overlap, the second dielectric layers 23 and 25 are placed between the silicon thin-film layers. In the three or more silicon thin-film layers 22, 24 and 26, the silicon thin-film layers which are adjacent to each other have different conductivity types. Note that the number of silicon thin-film layers may be four or more. Further, when the number of silicon thin-film layers is four or more, the number of second dielectric thin-film layers increases according to the number of silicon thin-film layers.

In such a light control element, it is possible to reduce the size of the element and lower the drive voltage. Further, the reduction of the size of the element leads to reduction of capacitance, which produces an advantageous effect of making high-speed control possible. Furthermore, the lowering of the drive voltage produces advantageous effects such as reducing power consumption and eliminating the need for a particular driver circuit such as a booster circuit in addition, while the thickness of each of the silicon thin-film layers 22, 24 and 26 is made thinner, the thickness of the silicon thin-film layers as a whole can be relatively thicker. It is thereby possible to relatively reduce the resistance of the silicon thin-film layers as a whole in the cross direction, thereby enabling a relatively higher response. It is thus possible to realize a small size and high performance light control element.

First Embodiment

Figure 2:
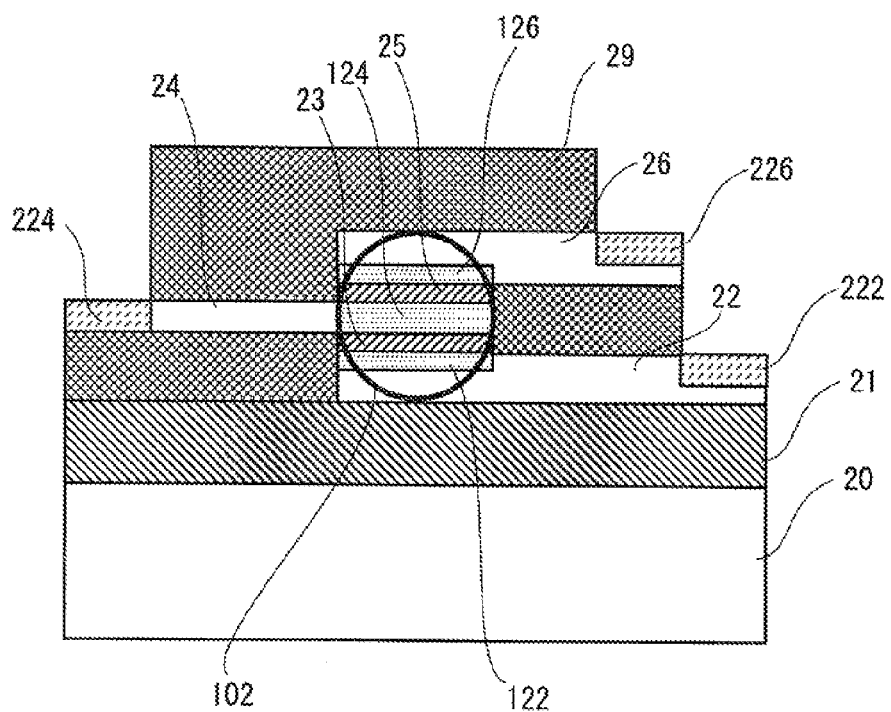
FIG. 2 is a cross sectional view showing a structure of a light control element according to a first embodiment of the present invention.

A structure of a light control element according to a first embodiment of the present invention is described hereinafter with reference to FIG. 2. FIG. 2 is a cross sectional view showing the structure of the light control element according to the embodiment. The light control element according to the first embodiment includes a silicon substrate 20, a buried oxide layer 21, a silicon thin-film layer 22, a dielectric thin-film layer 23, a silicon thin-film layer 24, a dielectric thin-film layer 25, a silicon thin-film layer 26, and a clad layer 29.

The silicon thin-film layer 22 has a region 222 and a region 122. The silicon thin-film layer 24 has a region 124 and a region 224. The silicon thin-film layer 26 has a region 126 and a region 226. The region 124 and the region 126 are carrier modulation regions where the carrier density varies. Further, the region 224 and the region 226 are high concentration doped regions in which impurity is doped with a high concentration.

On the silicon substrate 20, the buried oxide layer 21, which is the first dielectric layer, is formed. The buried oxide layer 21 is made of silicon oxide. On the buried oxide layer 21, the silicon thin-film layers 22, 24 and 26 are placed. The three silicon thin-film layers 22, 24 and 26 are formed to overlap with one another. In the part where the three silicon thin-film layers 22, 24 and 26 overlap, the dielectric thin-film layers 23 and 25 are placed. Specifically, a part of the silicon thin-film layer 22 is placed opposite to a part of the silicon thin-film layer 24 with the dielectric thin-film layer 23 interposed therebetween. Likewise, a part of the silicon thin-film layer 26 is placed opposite to a part of the silicon thin-film layer 24 with the dielectric thin-film layer 25 interposed therebetween.

Therefore, above the buried oxide layer 21, the silicon thin-film layers 22, 24 and 26 and the dielectric thin-film layers 23 and 25 are arranged in alternate lamination. Thus, a laminated structure in which the dielectric thin-film layers 23 and 25 are formed between the silicon thin-film layers 22, 24 and 26 is provided. The bottom layer and the top layer of the laminated structure are the silicon thin-film layers. Further, the part where the silicon thin-film layer 22 and the silicon thin-film layer 24 overlap and the part where the silicon thin-film layer 26 and the silicon thin-film layer 24 overlap are at the same position. Specifically, the dielectric thin-film layer 23 and the dielectric thin-film layer 25 are formed to overlap. Thus, the silicon thin-film layer 22, the dielectric thin-film layer 23, the silicon thin-film layer 24, the dielectric thin-film layer 25 and the silicon thin-film layer 26 are arranged sequentially from the bottom. Hereinafter, a part where the silicon thin-film layer 22, the dielectric thin-film layer 23, the silicon thin-film layer 24, the dielectric thin-film layer 25 and the silicon thin-film layer 26 are laminated is referred to as an overlap portion. In FIG. 2, the silicon thin-film layers 22 and 26 extend to the right from the overlap portion, and the silicon thin-film layer 24 extends to the left from the overlap portion. Note that, although the three silicon thin-film layers 22, 24 and 26 are formed in FIG. 2, three or more silicon thin-film layers may be formed.

The clad layer 29, which is the third dielectric layer, is formed to surround the silicon thin-film layers 22, 24 and 26 and the dielectric thin-film layers 23 and 25. Specifically, the clad layer 29 is formed on the outside of the dielectric thin-film layers 23 and 25. In FIG. 2, the clad layer 29 is placed on the left of the silicon thin-film layer 22 and below the silicon thin-film layer 24. Further, the clad layer 29 on the right of the silicon thin-film layer 24 is placed between the silicon thin-film layer 22 and the silicon thin-film layer 26. Further, the clad layer 29 is placed above the silicon thin-film layer 24 and above the silicon thin-film layer 26. Thus, the clad layer 29 is formed to cover the silicon thin-film layer 24 and the silicon thin-film layer 26.

P-type or n-type impurities are added to the silicon thin-film layers 22, 24 and 26. Further, the impurities are added so that the silicon thin-film layers which are adjacent to each other have different conductivity types. Thus, the n-type silicon thin-film layer is adjacent to the p-type silicon thin-film layer, and the p-type silicon thin-film is adjacent to the n-type silicon thin-film layer. For example, when the silicon thin-film layers 22 and 26 are p-type, the silicon thin-film layer 24 is doped with n-type. On the other hand, when the silicon thin-film layers 22 and 26 are n-type, the silicon thin-film layer 24 is doped with p-type. To form the p-type silicon, acceptor impurity such as boron (B) is added, and to form the n-type silicon, donor impurity such as phosphorus (P) is added. In this manner, three or more silicon thin-film layers are laminated in such a way that the silicon thin-film layers of different conductive layers are arranged alternately.

The following description is based on the assumption that the silicon thin-film layers 22 and 26 are doped with p-type, and the silicon thin-film layer 24 is doped with n-type. The regions 222, 224 and 226 which are doped with a high concentration to establish electrical connection with the outside are respectively provided in the silicon thin-film layers 22, 24 and 26. The regions 222, 224 and 226 are sufficiently apart from the overlap portion. Note that the "sufficiently apart" means that it is apart to a degree that prevents light propagating through a region 102 from sustaining losses from the regions 222, 224 and 226, For the silicon substrate 20, the buried oxide layer 21 and the silicon thin-film layer 22, a commercially available SOI (Silicon on Insulator) substrate may be used, for example. Note that it is preferred that one or more silicon thin-film layers are polysilicon layers. Therefore, it is preferred to use polysilicon layers as the silicon thin-film layers 24 and 26, other than the silicon thin-film layer 22. For the dielectric thin-film layers 23 and 25, material which is transparent to control light and highly electrically insulating is used. When a wavelength of light is in a near-infrared region (wavelength: about 1.3 to 1.6 μm) that is generally used in optical communications, the material which is transparent to light is preferably silicon oxide ($SiO_2$), silicon nitride (SiN), silicon oxynitride (SiON), a composite film of those or the like. Further, use of so-called high-k material is more preferable in that variation of the carrier density can be enlarged. The high-k material involves hafnium oxide ($HfO_2$), hafnium silicate (HfSiO), zirconium oxide ($ZrO_2$), lanthanum oxide ($La_2O_3$) or the like. For the dielectric thin-film layers 23 and 25, which are the second dielectric layers, it is preferred to use a single layer film of hafnium oxide ($HfO_2$), hafnium silicate (HfSiO), zirconium oxide ($ZrO_2$) or lanthanum oxide ($La_2O_3$) or a composite film of those. For the clad layer 29, material which has a lower refractive index than the silicon thin-film layers 22, 24 and 26, is transparent to control light, and is highly electrically insulating is used. Silicon oxide ($SiO_2$), silicon nitride (SiN), silicon oxynitride (SiON), a composite film of those or the like is most suitable as such material.

The buried oxide layer 21 has a role of preventing light propagating through the optical waveguide from leaking to the silicon substrate 20. Therefore, it is preferred that the buried oxide layer 21 has a thickness of about 2 μm or more. The total thickness of the silicon thin-film layers 22, 24 and 26 is set so that propagation light is single-mode in the thickness direction. Therefore, it is preferred that the total thickness of the silicon thin-film layers 22, 24 and 26 is about 200 to 1500 nm. Further, in the cross direction, light is confined in the overlap portion where the silicon thin-film layers 22, 24 and 26 overlap. Thus, the width of the overlap portion is set so that light is single-mode in the cross direction. The width of the overlap portion is preferably about 200 to 1500 nm. The thickness of the dielectric thin-film layers 23 and 25 is preferably as thin as possible within the range where the insulation among the silicon thin-film layers 22, 24 and 26 is maintained. It is preferred that the thickness of the dielectric thin-film layers 23 and 25 is about 10 nm or less so that the electric field distribution of light does not have a node in the thickness direction. The thickness of the clad layer 29 is set so that propagation light is not affected by the surface of the clad layer. Therefore, it is preferred that the thickness of the clad layer 29 is about 1 μm or more.

Next, an operation of the light control element according to the first embodiment is described. The refractive index of the silicon thin-film layers 22, 24 and 26 is about 3.5. The refractive index of the buried oxide layer 21 is about 1.45. The refractive index of the clad 10 layer 29 is lower than the refractive index of the silicon thin-film layers 22, 24 and 26. Further, the thickness of the dielectric thin-film layers 23 and 25 is sufficiently thinner with respect to the wavelength of light. Therefore, light is confined in the silicon thin-film layers 22, 24 and 26 in the thickness direction. Only in the overlap portion of the silicon thin-film layers 22, 24 and 26, the equivalent refractive index is higher than in the other part. By a difference in the equivalent refractive index, light is confined in the overlap portion of the silicon thin-film layers 22, 24 and 26 in the horizontal direction. Thus, the electric field distribution of light is mostly over the region 102. In this manner, the region 102 is an electric field distribution region where the electric field distribution of light is distributed.

It is assumed that a relatively positive voltage is applied to the regions 222 and 226 doped into p-type with a high concentration, and a relatively negative voltage is applied to the region 224 doped into n-type with a high concentration. In this case, the regions 122, 124 and 126 of the silicon thin-film layers 22, 24 and 26 which are adjacent to the dielectric thin-film layers 23 and 25 are in accumulated state. The density of holes increases in the regions 122 and 126 of the p-type silicon thin-film layers 22 and 26, and the density of electrons increases in the region 124 of the n-type silicon thin-film layer 24. On the contrary, it is assumed that a relatively negative voltage is applied to the regions 222 and 226 doped into p-type with a high concentration, and a relatively positive voltage is applied to the region 224 doped into n-type with a high concentration. In this case, the regions 122, 124 and 126 of the silicon thin-film layers 22, 24 and 26 are in depleted state. Thus, the density of holes decreases in the regions 122 and 126 of the p-type silicon thin-film layers 22 and 26, and the density of electrons decreases in the region 124 of the n-type silicon thin-film layer 24. In this manner, the carrier density of the regions 122, 124 and 126 of the silicon thin-film layers 22, 24 and 26 varies depending on the applied voltage. Then, the refractive index changes by the carrier plasma effect, so that the phase of light propagating therethrough can be controlled.

It should be noted that, although the region 124 of the silicon thin-film layer 24 in which the carrier density is modulated is illustrated as a single region in FIG. 2, whether the region 124 is a singe region as in FIG. 2 or a region divided into upper and lower parts is determined based on a magnitude relation of the thickness of the silicon thin-film layer 24 and the thickness of the accumulation and depletion region formed by voltage application. Specifically, when the thickness of the accumulation and depletion region is sufficiently thinner than the silicon thin-film layer 24, the region 124 is a region which is divided into upper and lower parts in close proximity to the dielectric thin-film layer 23 and the dielectric thin-film layer 25. Specifically, the region 124 is divided into a lower part in close proximity to the dielectric thin-film layer 23 and an upper part in close proximity to the dielectric thin-film layer 25.

The thickness of the accumulation and depletion region depends on a doping concentration, an applied voltage or the like of the accumulation and depletion region. In the thickness direction, the electric field distribution of light reaches its peak near the center of the silicon thin-film layer 24. Accordingly, in order to obtain high modulation efficiency, it is preferred that the region 124 where the carrier density is modulated is united without being divided into upper and lower parts. Therefore, it is effective that the silicon thin-film layer 24 is thinner than the other silicon thin-film layers 22 and 26. The thickness of at least one silicon thin-film layer is different from the thickness of the other silicon thin-film layers. Then, the silicon thin-film layer is made thinner in a part where the electric field strength of light is high. Specifically, of the three or more silicon thin-film layers, the thickness of the silicon thin-film layer in the part where the electric field strength of light is high is thinner than the thickness of the silicon thin-film layer in the other part. In the silicon thin-film layer 24 with a small film thickness, the electric field strength of light is higher than that in the silicon thin-film layers 22 and 26 with a large film thickness.

Further, by lowering the doping concentration of the silicon thin-film layer 24 than the other silicon thin-film layers 22 and 26, the same effect can be obtained. Further, in this case, the effect of reducing the absorption loss of light due to doping can be obtained. Specifically, the silicon thin-film layer 24 which is placed at the middle in the thickness direction is doped with a lower concentration than the silicon thin-film layers 22 and 26 at the both ends in the thickness direction.

In this manner, the doping concentration of at least one silicon thin-film layer is different from the doping concentration of the other silicon thin-film layers. Specifically, of the three or more silicon thin-film layers, the doping concentration of the silicon thin-film layer in the part where the electric field strength of light is high is lower than the doping concentration of the silicon thin-film layer in the other part. In the silicon thin-film layer with a low doping concentration, the electric field strength of light is higher than in the silicon thin-film layer with a high doping concentration. In this manner, the doping concentration is selected according to the electric field strength of light.

Next, the silicon optical modulator disclosed in Patent Literature 1 and the light control element according to the embodiment are compared. In the silicon optical modulator disclosed in Patent Literature 1, the number of silicon layers is only two: the surface silicon layer 12 and the polysilicon gate layer 14. Therefore, in order to sufficiently confine light inside the surface silicon layer 12 and the polysilicon gate layer 14 in the thickness direction, it is necessary to make each of the surface silicon layer 12 and the polysilicon gate layer 14 thick to a certain degree. On the other hand, in the light control element according to the embodiment, the number of silicon layers is three: the silicon thin-film layers 22, 24 and 26. Therefore, it is possible to reduce the thickness of each of the silicon thin-film layers 22, 24 and 26 compared to that in the silicon optical modulator disclosed in Patent Literature 1. Specifically, even when the silicon thin-film layers are made thinner, it is possible to efficiently confine light inside the silicon thin-film layers 22, 24 and 26 in the thickness direction.

Further, although the carrier modulation regions where the carrier density varies are only the regions 112 and 114 in the silicon optical modulator disclosed in Patent Literature 1, the carrier modulation regions where the carrier density varies are the regions 122, 124 and 126 in the light control element according to the embodiment. Accordingly, the cross section area of the part where the carrier density varies is widen. Further, in the vicinity of the part where the electric field strength of light reaches its peak, the region 124 can be formed all over the thickness direction of the silicon thin-film layer 24. It is therefore possible to enlarge the overlap of the refractive index modulation region and the electric field distribution of light compared to Patent Literature 1.

Thus, the light control element according to the embodiment can reduce the size of the element and lower the drive voltage compared to the silicon optical modulator disclosed in Patent Literature 1. Further, the reduction of the size of the element leads to reduction of capacitance, which produces an advantageous effect of making high-speed control possible.

Furthermore, the lowering of the drive voltage produces advantageous effects such as reducing power consumption and eliminating the need for a particular driver circuit such as a booster circuit. In addition, while the thickness of each of the silicon thin-film layers 22, 24 and 26 is made thinner, the thickness of the silicon thin-film layers as a whole can be relatively thicker, and it is thus possible to relatively reduce the resistance of the silicon thin-film layers as a whole in the cross direction, thereby enabling a relatively higher response. It is therefore possible to realize a small size and high performance light control element.

Second Embodiment

Figure 3:
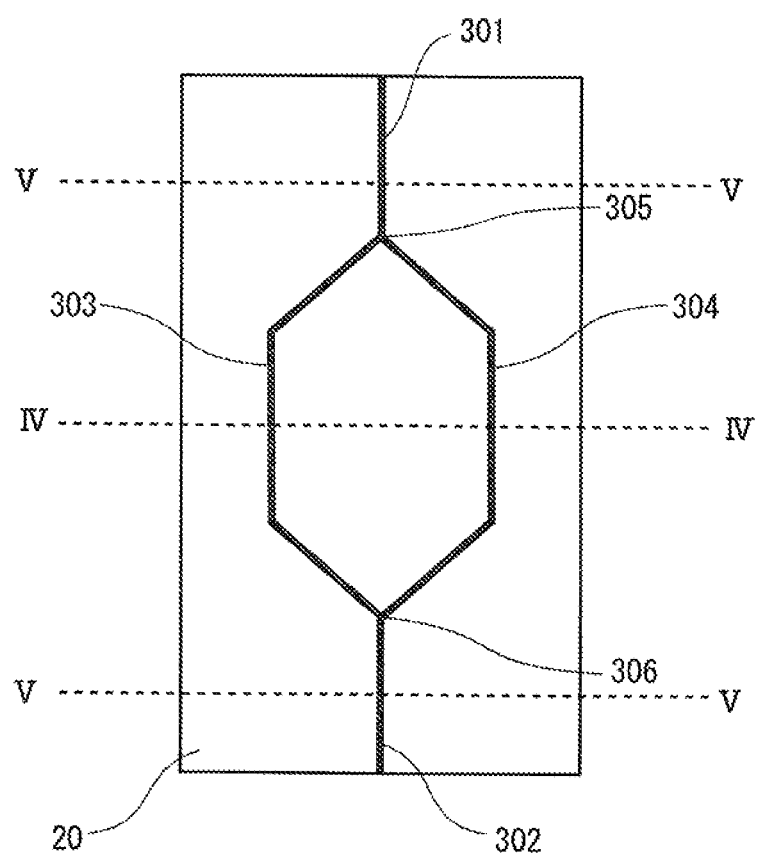
FIG. 3 is a plan view showing a structure of an optical waveguide circuit according to a second embodiment of the present invention.

A structure of an optical waveguide circuit according to a second embodiment of the present invention is described hereinafter with reference to FIG. 3. FIG. 3 is a plan view showing the optical waveguide circuit according to the embodiment. Note that, in the optical waveguide circuit, the light control element according to the first embodiment is used. The light control element having the cross sectional structure shown in FIG. 2 is used for phase modulation waveguides 303 and 304.

In the optical waveguide circuit according to the second embodiment of the present invention, on the silicon substrate 20, an input waveguide 301, a branching waveguide 305, phase modulation waveguides 303 and 304, a merging waveguide 306 and an output waveguide 302 are sequentially optically connected to produce a Mach-Zehnder interferometer. The input waveguide 301, the branching waveguide 305, the phase modulation waveguide 303, the phase modulation waveguide 304, the merging waveguide 306 and the output waveguide 302 are formed on the same silicon substrate 20.

The input waveguide 301 is coupled to the branching waveguide 305. The branching waveguide 305 has a Y-junction shape and branches the input waveguide 301 into two. Specifically, one input waveguide 301 is branched into two by the branching waveguide 305. Then, one waveguide branched by the branching waveguide 305 is coupled to the phase modulation waveguide 303, and the other waveguide is coupled to the phase modulation waveguide 304. Specifically, the input waveguide 301 is coupled to the two phase, modulation waveguides 303 and 304 via the branching waveguide 305. Then, the phase modulation waveguide 303 and the phase modulation waveguide 304 are coupled to the merging waveguide 306. The merging waveguide 306 has a Y-junction shape and merges the phase modulation waveguide 303 and the phase modulation waveguide 304 into one waveguide. Specifically, the phase modulation waveguide 303 and the phase modulation waveguide 304 are coupled to the output waveguide 302 via the merging waveguide 306. Thus, light from the input waveguide 301 propagates to the output waveguide 302 through the phase modulation waveguide 303 or the phase modulation waveguide 304.

Figure 4:
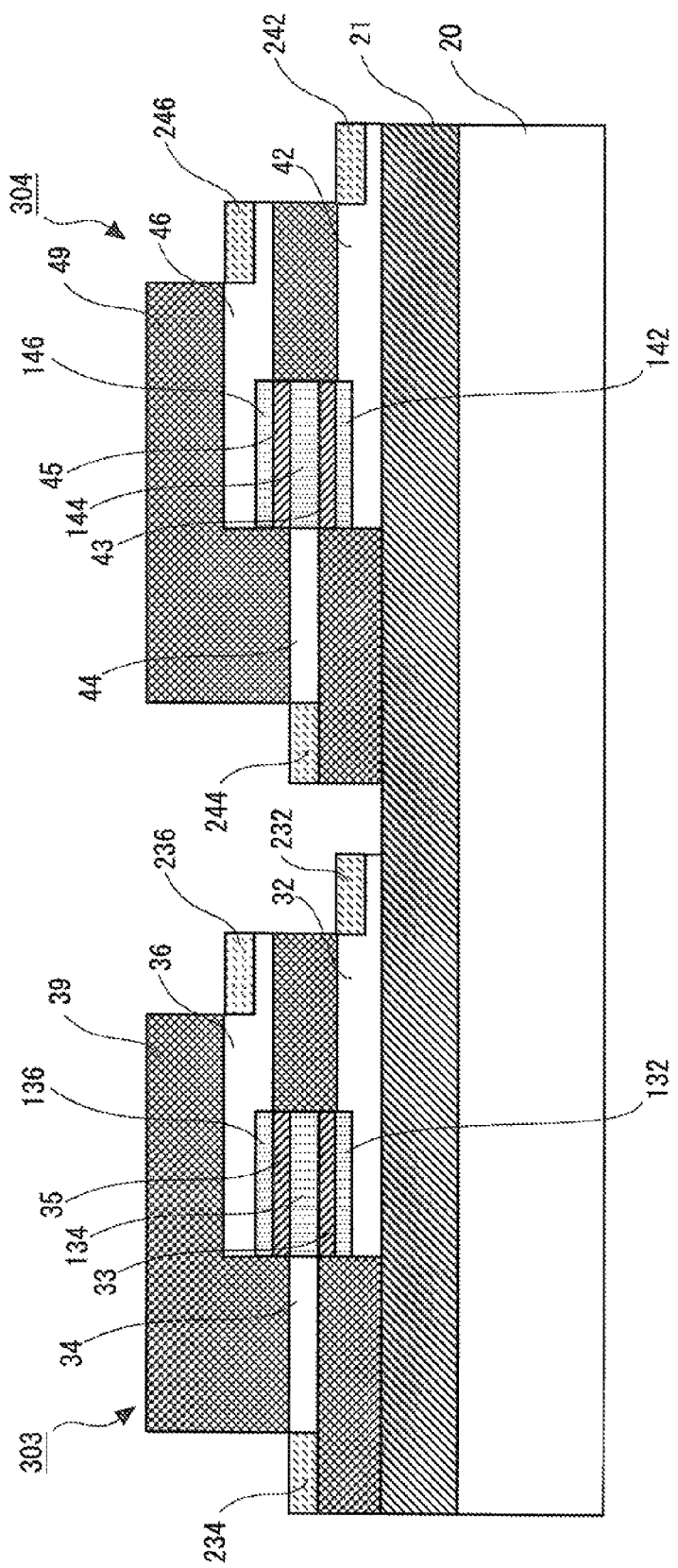
FIG. 4 is a view showing the optical waveguide circuit according to the second embodiment of the present invention, which is a cross sectional view along line IV-IV in FIG. 3.

FIG. 4 is a cross sectional view along line IV-IV in FIG. 3, which is the phase modulation waveguides 303 and 304 section. The cross sectional structure of each of the phase modulation waveguides 303 and 304 is such that the cross sectional structures of the light control element described in the first embodiment of the present invention are arranged in close proximity on the same silicon substrate 20. Thus, the cross sectional structure of the phase modulation waveguide 303 is substantially the same as the cross sectional structure of the phase modulation waveguide 304. Note that the silicon thin-film layer 22 shown in FIG. 2 corresponds to silicon thin-film layers 32 and 42 in FIG. 4, the silicon thin-film layer 24 shown in FIG. 2 corresponds to silicon thin-film layers 34 and 44 in FIG. 4, and the silicon thin-film layer 26 shown in FIG. 2 corresponds to silicon thin-film layers 36 and 46 in FIG. 4.

Likewise, the dielectric thin-film layer 23 shown in FIG. 2 corresponds to dielectric thin-film layers 33 and 43 in FIG. 4, and the dielectric thin-film layer 23 shown in FIG. 2 corresponds to dielectric thin-film layers 33 and 43 in FIG. 4. In the following description, it is assumed that the silicon thin-film layers 32, 36, 42 and 46 are doped with p-type, and the silicon thin-film layers 34 and 44 are doped with n-type.

The buried oxide layer 21 is formed to cover the silicon substrate 20. Above the buried oxide layer 21, the silicon thin-film layers 32, 34 and 36 and the silicon thin-film layers 42, 44 and 46 are formed. Note that the silicon thin-film layer 32 and the silicon thin-film layer 42 are formed in the same layer. Therefore, the silicon thin-film layer 32 and the silicon thin-film layer 42 have substantially the same thickness. Likewise, the silicon thin-film layer 34 and the silicon thin-film layer 44, and the silicon thin-film layer 36 and the silicon thin-film layer 46 respectively have substantially the same thickness. Further, the dielectric thin-film layer 33 and the dielectric thin-film layer 43, and the dielectric thin-film layer 35 and the dielectric thin-film layer 45 respectively have substantially the same thickness.

The phase modulation waveguide 303 and the phase modulation waveguide 304 are formed with a space therebetween. Specifically, the silicon thin-film layers 32, 34 and 36 of the phase modulation waveguide 303 are formed spaced from the silicon thin-film layers 42, 44 and 46 of the phase modulation waveguide 304. Therefore, independent voltages can be applied to the phase modulation waveguide 303 and the phase modulation waveguide 304.

Figure 5:
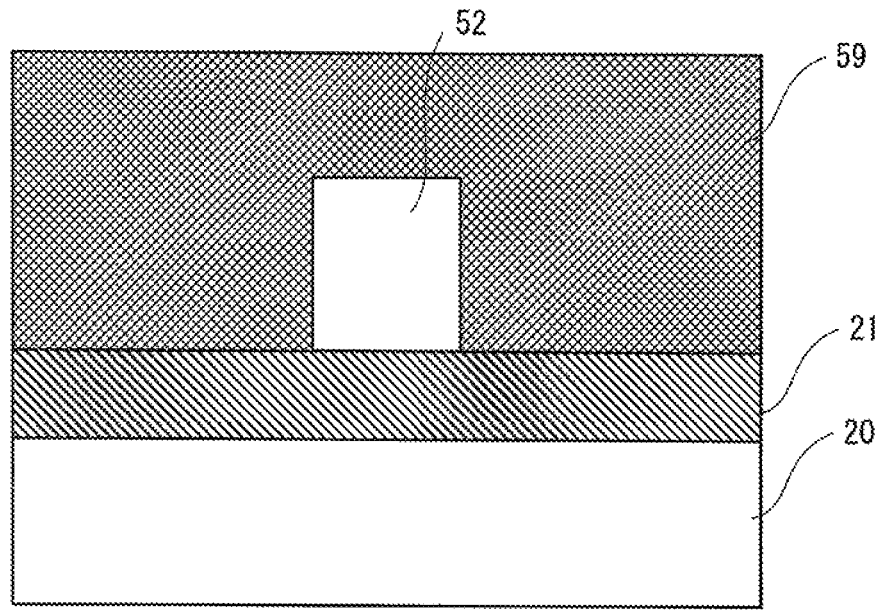
FIG. 5 is a view showing the optical waveguide circuit according to the second embodiment of the present invention, which is a cross sectional view along line V-V in FIG. 3.

FIG. 5 is a cross sectional view along line V-V in FIG. 3, which is the input waveguide 301 or the output waveguide 302 section. The input waveguide 301 and the output waveguide 302 have basically the same cross sectional structure, and the cross sectional structure is shown in FIG. 5. Because it is not necessary to modulate the refractive index in the input waveguide 301 and the output waveguide 302, they have a cross sectional structure of a hitherto known waveguide. Specifically, a silicon core 52 is placed above the silicon substrate 20 with the buried oxide layer 21 interposed therebetween. The cross section of the silicon core 52 is rectangular. The silicon core 52 is placed on the buried oxide layer 21. Then, a clad layer 59 is placed to cover the silicon core 52. In this manner, the silicon core 52 is surrounded by the buried oxide layer 21 and the clad layer 59. Specifically, the lower surface of the silicon core 52 is in contact with the buried oxide layer 21, and the upper surface and the side surfaces of the silicon core 52 are in contact with the clad layer 59.

Next, an operation of the optical waveguide circuit according to the second embodiment is described. Light input to the input waveguide 301 is divided in half by the branching waveguide 305. One of the divided light enters the phase modulation waveguide 303 and the other one enters the phase modulation waveguide 304. The principle of operation of the refractive index modulation in each of the phase modulation waveguides 303 and 304 is the same as that in the first embodiment of the present invention. Note that voltages are applied so that changes in the refractive index are opposite in the phase modulation waveguide 303 and the phase modulation waveguide 304. Therefore, the efficiency of modulation can be doubled by push-pull operation. For example, a relatively positive voltage is applied to regions 232, 236 and 244, and a relatively negative voltage is applied to regions 234, 242 and 246. Accordingly, regions 132, 134 and 136 of the phase modulation waveguide 303 are brought into accumulated state, and regions 142, 144 and 146 of the phase modulation waveguide 304 are brought into depleted state. Thus, the push-pull operation can be implemented. Independent phase control can be thereby made for each of light propagating through the phase modulation waveguide 303 and light propagating through the phase modulation waveguide 304. The light whose phase is modulated in opposite directions in the phase modulation waveguide 303 and the phase modulation waveguide 304 are merged at the merging waveguide 306. At this point, the light from the phase modulation waveguide 304 and the light from the branching waveguide 305 interfere at the merging waveguide 306. Specifically, the light from the phase modulation waveguide 304 and the light from the branching waveguide 305 are combined so that the intensity of light is modulated according to a phase difference. Thus, the two light beams are combined at the branching waveguide 305 into interference light. The combined light is output from the output waveguide 302. In this manner, the optical waveguide circuit according to the embodiment functions as the Mach-Zehnder interferometer.

Figure 6:
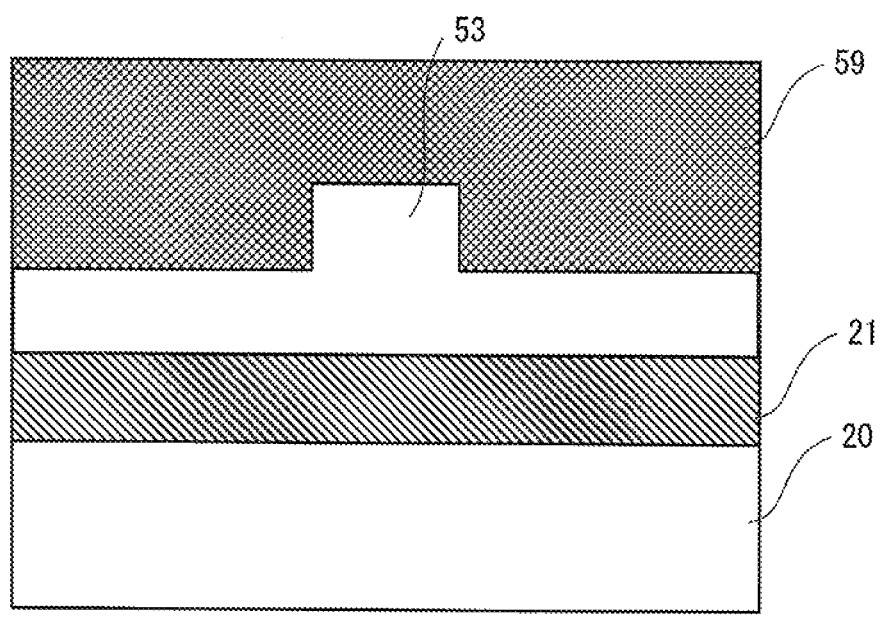
FIG. 6 is a view showing another structure of the optical waveguide circuit according to the second embodiment of the present invention, which is a cross sectional view along line V-V in FIG. 3.

It should be noted that the cross sectional shape of the input waveguide 301 and the output waveguide 302 is not limited to the above-described cross sectional shape. For example, a silicon core 53 having the cross sectional shape shown in FIG. 6 may be used rather than the silicon core 52 having the rectangular cross sectional shape shown in FIG. 5. In FIG. 6, the cross sectional shape of the silicon core 56 is a projecting shape.

Further, the branching waveguide 305 and the merging waveguide 306 are not limited to the Y-junction type waveguide as shown in FIG. 2. For example, as the branching waveguide 305 and the merging waveguide 306, a directional coupler type, a multimode interferometer (MMI) type or the like may be used. In such a case, if a 2×2 directional coupler or MMI is used, it can function also as a 2×2 optical switch. Further, in the phase modulation waveguide 303 and the phase modulation waveguide 304, the cross sectional shape may be the same entirely along the propagation direction of light or the cross sectional shape may vary in mid course. Specifically, the cross sectional structure as shown in FIG. 4 may be fixed entirely along the propagation direction of light. Alternatively, only a part may have the cross sectional structure as shown in FIG. 4, and the remaining part may have a waveguide with the cross sectional structure as shown in FIG. 5 or 6. Further, although the lengths of the phase modulation waveguide 303 and the phase modulation waveguide 304 are illustrated as being equal in FIG. 4, they may be different from each other. In this case, the periodical wavelength dependence occurs in light transmittance, so that it functions also as a tunable filter.

The optical waveguide circuit according to the second embodiment includes the light control element according to the first embodiment. The light control element of the first embodiment is used for the phase modulation waveguide 303 and the phase modulation waveguide 304. Therefore, the lengths of the phase modulation waveguide 303 and the phase modulation waveguide 304 can be shortened for the same reason as the reason described in the first embodiment. Thus, it is possible to reduce the size of the element and lower the drive voltage compared to the silicon optical modulator disclosed in Patent Literature 1. Further, the reduction of the size of the element leads to reduction of capacitance. This produces an advantageous effect of making high-speed control possible. Furthermore, the lowering of the drive voltage produces advantageous effects such as reducing power consumption and eliminating the need for a particular driver circuit such as a booster circuit. It is therefore possible to realize a small size and high performance optical waveguide circuit. As described above, the light control element according to the first embodiment is suitable for the Mach-Zehnder interferometer using the optical waveguide.

Third Embodiment

Figure 7:
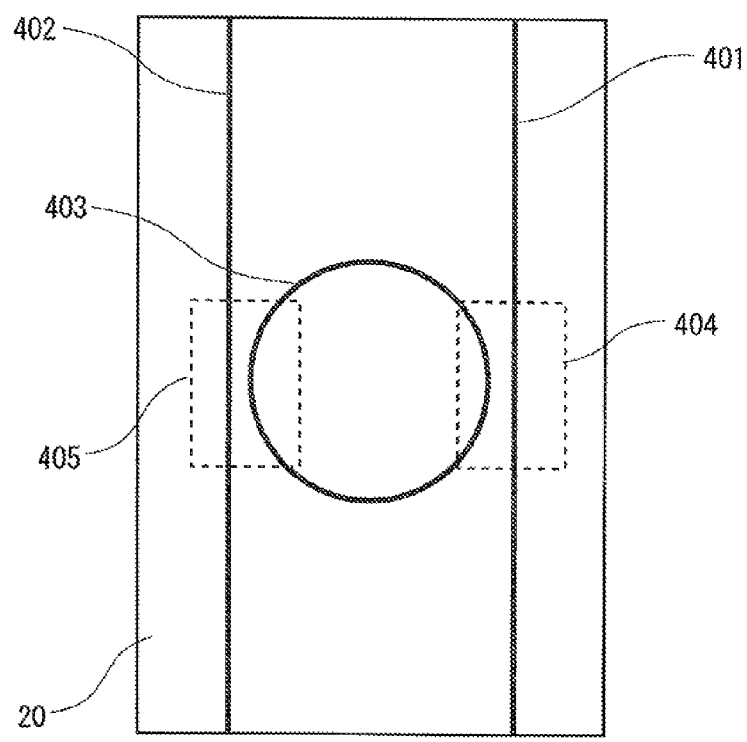
FIG. 7 is a plan view showing a structure of an optical waveguide circuit according to a third embodiment of the present invention.

A structure of an optical waveguide circuit according to a third embodiment of the present invention is described hereinafter with reference to FIG. 7. FIG. 7 is a plan view showing the optical waveguide circuit according to the third embodiment. In the optical waveguide circuit according to the third embodiment, on the silicon substrate 20, an input waveguide 401, an output waveguide 402 and a ring waveguide 403 are placed. The input waveguide 401 and the output waveguide 402 are optically coupled to the ring waveguide 403 through a coupling portion 404 and a coupling portion 405, respectively. Specifically, the input waveguide 401 is coupled to the ring waveguide 403 through the coupling portion 404. Likewise, the input waveguide 402 is coupled to the ring waveguide 403 through the coupling portion 405. The cross sectional structure of the input waveguide 401 and the output waveguide 402 is the same as the cross sectional structure shown in FIG. 5 or FIG. 6. Further, the cross sectional structure of the ring waveguide 403 is the same as the cross sectional structure shown in FIG. 2. A directional coupler, a multimode interferometer or the like may be applied to the coupling portion 404 and the coupling portion 405.

The circular ring waveguide 403 is formed on the silicon substrate 20. The linear input waveguide 401 and the linear output waveguide 402 are placed on both sides of the ring waveguide 403. Thus, the ring waveguide 403 is placed between the linear input waveguide 401 and the linear output waveguide 402. In FIG. 7, the input waveguide 401 and the output waveguide 402 are formed in substantially parallel with each other. Further, the coupling portions 404 and 405 are arranged adjacent to the circular ring waveguide 403. The coupling portion 404 is placed at the position where the ring waveguide 403 and the input waveguide 401 are in close proximity. The coupling portion 405 is placed at the position where the ring waveguide 403 and the output waveguide 402 are in close proximity. The input waveguide 401, the output waveguide 402, the ring waveguide 403, the coupling portion 404 and the coupling portion 405 are formed on the same silicon substrate 20.

The input waveguide 401 and the ring waveguide 403 are optically coupled by the coupling portion 404. Further, the output waveguide 402 and the ring waveguide 403 are optically coupled by the coupling portion 405. By such coupling, the optical waveguide circuit makes the ring waveguide.

Next, an operation of the optical waveguide circuit according to the third embodiment is described. Among light input to the input waveguide 401, only light near a wavelength that satisfies a resonance condition of the ring waveguide 403 is coupled to the ring waveguide 403 through the coupling portion 404. Further, the light near the wavelength that satisfies the resonance condition is coupled to the output waveguide 402 through the coupling portion 405 and output from the output waveguide 402. Specifically, among light propagating through the input waveguide 401, only the light with the wavelength that satisfies the resonance condition passes through the coupling portion 404 and enters the ring waveguide 403. The light propagates along the ring waveguide 403 and then enters the coupling portion 405. Then, the light that satisfies the resonance condition enters the output waveguide 402 at the coupling portion 405. Thus, the light that satisfies the resonance condition propagates sequentially through the input waveguide 401, the coupling portion 404, the ring waveguide 403, the coupling portion 405 and the output waveguide 402. On the other hand, light with a wavelength that does not satisfy the resonance condition is not coupled to the ring waveguide 403 and output from the other end of the input waveguide 401. Thus, the light with the wavelength that does not satisfy the resonance condition propagates along the input waveguide 401.

The cross sectional structure of the ring waveguide 403 is the same as the cross sectional structure in the first embodiment. Thus, the refractive index of the ring waveguide 403 can be modulated in the same principle of operation as in the first embodiment. When the refractive index of the ring waveguide 403 changes, a resonant wavelength of the ring resonator changes, so that a wavelength of light input to the input waveguide 401 and a wavelength of light output from the output waveguide 402 change. Thus, it operates as an intensity modulator for a certain fixed wavelength near the resonant wavelength and operates as a tunable filter for light with a plurality of different wavelengths.

In the optical waveguide circuit according to the third embodiment, sharp wavelength dependence can be given to transmittance by increasing a quality factor (which is generally referred to as a Q factor) of the resonator. As the Q factor increases, a larger change in transmittance can be obtained with a slight change in the refractive index of the ring waveguide 403. Accordingly, the optical waveguide circuit according to the third embodiment has a feature that further size reduction, lower voltage operation and lower power consumption are possible compared to the optical waveguide circuit according to the second embodiment. It is thereby possible to realize a smaller size and higher performance optical waveguide circuit. In this manner, the light control element according to the first embodiment is suitable for the ring resonator using the optical waveguide.

Fourth Embodiment

Figure 8:
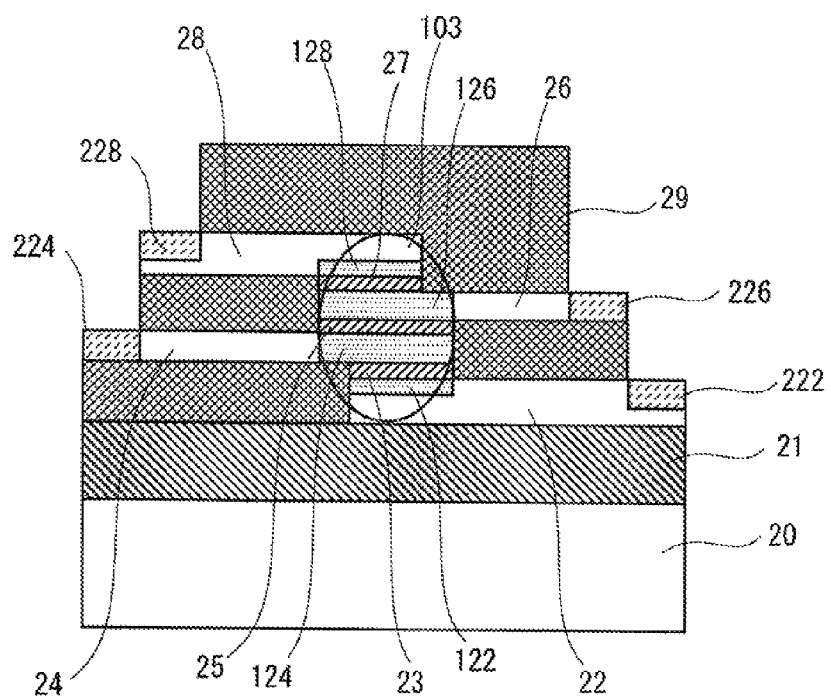
FIG. 8 is a cross sectional view showing a structure of a light control element according to a fourth embodiment of the present invention.
Figure 9:
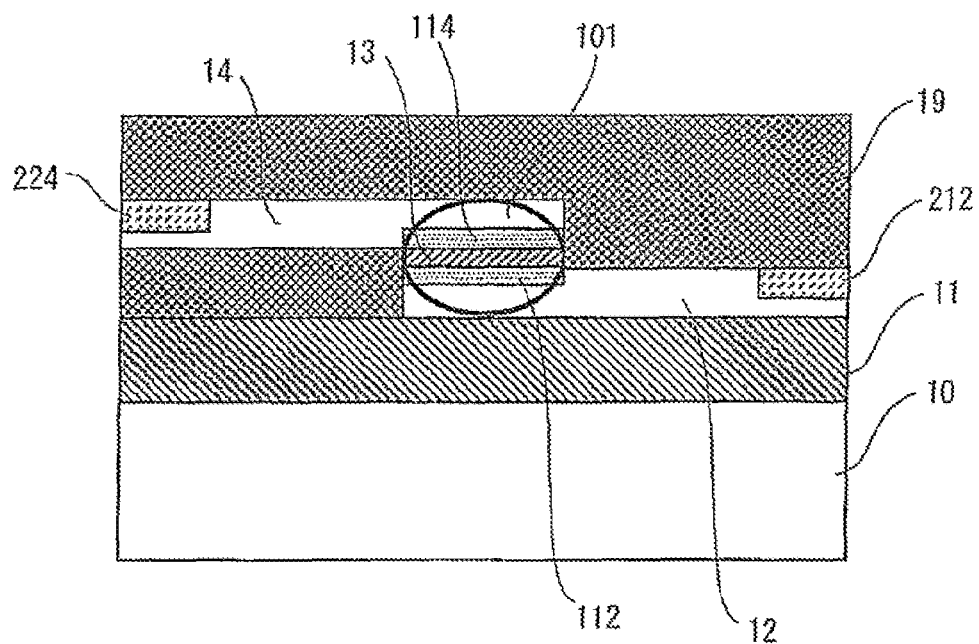
FIG. 9 is a cross sectional view showing a structure of a light control element disclosed in Patent Literature 1.

A structure of a light control element according to a fourth embodiment of the present invention is described hereinafter with reference to FIG. 8. FIG. 8 is a cross sectional view showing the structure of the light control element according to the embodiment. In the light control element according to this embodiment, the number of silicon thin-film layers and the number of dielectric thin-film layers increase by one compared to the light control element according to the first embodiment in other words, the light control element according to the embodiment has a structure in which four silicon thin-film layers are included in the light control element shown in FIG. 2. Note that the other structure is basically the same as that of the first embodiment and redundant explanation is omitted.

Compared to the first embodiment; the number of silicon thin-film layers and the number of dielectric thin-film layers increase by one each. Thus, as shown in FIG. 8, four silicon thin-film layers 22, 24, 26 and 28 and three dielectric thin-film layers 23, 25 and 27 are provided above the silicon substrate 20. The dielectric thin-film layer 23 is placed between the silicon thin-film layer 22 and the silicon thin-film layer 24. Likewise, the dielectric thin-film layer 25 is placed between the silicon thin-film layer 24 and the silicon thin-film layer 26, and the dielectric thin-film layer 27 is placed between the silicon thin-film layer 26 and the silicon thin-film layer 28. In this manner, the silicon thin-film layers and the dielectric thin-film layers are arranged alternately in the thickness direction. The silicon thin-film layer 28 has a region 128 and a region 228, like the other silicon thin-film layers 22, 24 and 26.

In other words, the three silicon thin-film layers 22, 24 and 26 in the light control element according to the first embodiment are replaced by the four silicon thin-film layers 22, 24, 26 and 28 in this embodiment. Likewise, the two dielectric thin-film layers 23 and 25 in the light control element according to the first embodiment are replaced by the three dielectric thin-film layers 23, 25 and 27 in this embodiment. Then, impurities are added so that the silicon thin-film layers 22, 24, 26 and 28 which are adjacent to each other have different conductivity types in the same manner as in the first embodiment.

Further, in this embodiment, the area of the overlap portion varies depending on the layer. Specifically, the width of the overlap portion between the silicon thin-film layer 22 and the silicon thin-film layer 24 and the width of the overlap portion between the silicon thin-film layer 26 and the silicon thin-film layer 28 are narrower than the width of the overlap portion between the silicon thin-film layer 24 and the silicon thin-film layer 26. Specifically, the overlap portion is the widest in the silicon thin-film layers 24 and 26 between which the dielectric thin-film layer 25 is interposed and which are located at the middle in the thickness direction. The area of the overlap portion is larger in the pair located at the middle in the thickness direction than in the pair located at both ends.

In this manner, the width of the region where at least one pair of adjacent silicon thin-film layers overlap is different from the width of the region where the other pair of adjacent silicon thin-film layers overlap. The width of the overlap portion is large in the part where the electric field strength of light is high. Thus, the width of the region where one pair of adjacent silicon thin-film layers overlap in the part where the electric field strength of light is high is larger than the width of the region where the other pair of adjacent silicon thin-film layers overlap. Specifically, the electric field strength of light is higher in the pair of silicon thin-film layers in which the width of the region where they overlap is wider than that of the other pair.

An operation of the light control element according to the fourth embodiment is substantially the same as in the first embodiment. Further, in addition to the first embodiment, the number of silicon thin-film layers where the carrier density or the refractive index is modulated increases. It is thereby possible to obtain a sufficient light confinement effect and horizontal conductivity even when the thickness of each silicon thin-film layer is made thinner. By making the silicon thin-film layer thinner, carriers can be accumulated or depleted all over the thickness of each silicon thin-film layer. Then, the overlap of the refractive index modulation region and the electric field distribution of light becomes larger, thereby enabling more efficient light control. Note that the electric field distribution of light is mostly over the region 103. Accordingly, the region 103 is an electric field distribution region where the electric field distribution of light is distributed.

Further, the width of the overlap between the silicon thin-film layer 22 and the silicon thin-film layer 24 and the width of the overlap between the silicon thin-film layer 26 and the silicon thin-film layer 28 are narrower than the width of the overlap between the silicon thin-film layer 24 and the silicon thin-film layer 26. It is thereby possible to make the part where the carrier density is likely to be largely modulated due to concentration of the electric field closer to the part where the electric field strength of light is high. This enables more efficient light control. Note that the part where the electric field is concentrated and the carrier density is likely to be largely modulated is at the end of the silicon thin-film layer 22 and the silicon thin-film layer 28.

The light control element according to the embodiment may be used for the phase modulation waveguides 303 and 304 of the optical waveguide circuit according to the second embodiment. Further, the light control element according to the embodiment may be used for the ring waveguide 403 of the optical waveguide circuit according to the third embodiment. Specifically, the cross sectional structure of the phase modulation waveguide 303, the phase modulation waveguide 304 or the ring waveguide 403 may be replaced by the cross sectional structure illustrated in the fourth embodiment.

Other Embodiments

Further, although the waveguide cross sections in the cases where the number of silicon thin-film layers is three and four are described above, the similar structure may be made with five or more silicon thin-film layers.

Further, although the structure using the commercially available SOI substrate is described for its advantage of simplifying the manufacturing process, the present invention is not limited thereto. Specifically, although the silicon substrate 20 and the buried oxide layer 21 as the dielectric layer thereabove are described above by way of illustration, other material may be used for the silicon substrate 20 provided that the material has a strength enough to support the structure thereabove. Further, a dielectric film may be used in place of the oxide layer 21. Specifically, material of the dielectric layer may be material different from the oxide layer provided that it has a lower refractive index than the silicon thin-film layers, is transparent to control light and highly electrically insulating. The above-described light control element is suitable for an optical modulator, an optical switch, a variable optical attenuator, a tunable filter and so on used for optical fiber communications, optical interconnection, optical signal processing or the like.

Although embodiments of the present invention are described in the foregoing, the present invention is not restricted to the above-described embodiments. Various changes and modifications as would be obvious to one skilled in the art may be made to the structure and detail of the present invention without departing from the scope of the invention. Further, the first to fifth embodiments and other embodiments may be combined as desirable.

INDUSTRIAL APPLICABILITY

The present invention is applicable to a light control element and an optical waveguide circuit and, particularly, applicable to a light control element such as an optical modulator, an optical switch, a variable optical attenuator or a tunable filter used for optical fiber communications, optical interconnection, optical signal processing and so on, and an optical waveguide circuit.

REFERENCE SIGNS LIST

10 SILICON SUBSTRATE
11 BURIED OXIDE LAYER
12 SURFACE SILICON LAYER
13 GATE DIELECTRIC LAYER
14 POLYSILICON GATE LAYER
19 SUPERPOSED DIELECTRIC LAYER
20 SILICON SUBSTRATE
21 BURIED OXIDE LAYER
22 SILICON THIN-FILM LAYER
23 DIELECTRIC THIN-FILM LAYER
24 SILICON THIN-FILM LAYER
25 DIELECTRIC THIN-FILM LAYER
26 SILICON THIN-FILM LAYER
27 DIELECTRIC THIN-FILM LAYER
28 SILICON THIN-FILM LAYER
29 CLAD LAYER
32 SILICON THIN-FILM LAYER
33 DIELECTRIC THIN-FILM LAYER
34 SILICON THIN-FILM LAYER
35 DIELECTRIC THIN-FILM LAYER
36 SILICON THIN-FILM LAYER
39 CLAD LAYER
42 SILICON THIN-FILM LAYER
43 DIELECTRIC THIN-FILM LAYER
44 SILICON THIN-FILM LAYER
45 DIELECTRIC THIN-FILM LAYER
46 SILICON THIN-FILM LAYER
49 CLAD LAYER
52 SILICON CORE
53 SILICON CORE
59 CLAD LAYER
101 REGION (ELECTRIC FIELD DISTRIBUTION REGION)
102 REGION (ELECTRIC FIELD DISTRIBUTION REGION)
103 REGION (ELECTRIC FIELD DISTRIBUTION REGION)
112 REGION (CARRIER MODULATION REGION)
114 REGION (CARRIER MODULATION REGION)
122 REGION (CARRIER MODULATION REGION)
124 REGION (CARRIER MODULATION REGION)
126 REGION (CARRIER MODULATION REGION)
128 REGION (CARRIER MODULATION REGION)
132 REGION (CARRIER MODULATION REGION)
134 REGION (CARRIER MODULATION REGION)
136 REGION (CARRIER MODULATION REGION)
142 REGION (CARRIER MODULATION REGION)
144 REGION (CARRIER MODULATION REGION)
146 REGION (CARRIER MODULATION REGION)
212 REGION (HIGH CONCENTRATION DOPED REGION)
214 REGION (HIGH CONCENTRATION DOPED REGION)
222 REGION (HIGH CONCENTRATION DOPED REGION)
0224 REGION (HIGH CONCENTRATION DOPED REGION)
226 REGION (HIGH CONCENTRATION DOPED REGION)
228 REGION (HIGH CONCENTRATION DOPED REGION)
232 REGION (HIGH CONCENTRATION DOPED REGION)
234 REGION (HIGH CONCENTRATION DOPED REGION)
242 REGION (HIGH CONCENTRATION DOPED REGION)
244 REGION (HIGH CONCENTRATION DOPED REGION)
246 REGION (HIGH CONCENTRATION DOPED REGION)
301 INPUT WAVEGUIDE
302 OUTPUT WAVEGUIDE
303 PHASE MODULATION WAVEGUIDE
304 PHASE MODULATION WAVEGUIDE
305 BRANCHING WAVEGUIDE
306 MERGING WAVEGUIDE
401 INPUT WAVEGUIDE
402 OUTPUT WAVEGUIDE
403 RING WAVEGUIDE
404 COUPLING PORTION
405 COUPLING PORTION

The invention claimed is:
1. A light control element comprising:
a first dielectric layer placed on a substrate;

three or more silicon thin-film layers placed on the first dielectric layer;

a second dielectric layer placed between the three or more silicon thin-film layers; and a third dielectric layer placed to surround the silicon thin-film layers and the second dielectric layer, wherein the three or more silicon thin-film layers are arranged to partially overlap with one another, the second dielectric layer is arranged between the silicon thin-film layers in a part where the silicon thin-film layers overlap, and in the three or more silicon thin-film layers, the silicon thin-film layers adjacent to each other have different conductivity types, wherein, of the three or more silicon thin-film layers, a thickness of a silicon thin-film layer in a part where electric field strength of light is high is thinner than a thickness of a silicon thin-film layer in another part.

2. The light control element according to claim 1, wherein, of the three or more silicon thin-film layers, a doping concentration of at least one silicon thin-film layer is different from a doping concentration of another silicon thin-film layer.

3. The light control element according to claim 1, wherein, of the three or more silicon thin-film layers, a doping concentration of a silicon thin-film layer in a part where electric field strength of light is high is lower than a doping concentration of a silicon thin-film layer in another part.

4. The light control element according to claim 1, wherein a width of a region where at least one pair of adjacent silicon thin-film layers overlap is different from a width of a region where another pair of adjacent silicon thin-film layers overlap.

5. The light control element according to claim 1, wherein a width of a region where one pair of adjacent silicon thin-film layers overlap in a part where electric field strength of light is high is wider than a width of a region where another pair of adjacent silicon thin-film layers overlap.

6. The light control element according to claim 1, wherein the substrate is made of silicon.

7. The light control element according to claim 1, wherein the first dielectric layer is made of silicon oxide.

8. The light control element according to claim 1, wherein the substrate, the first dielectric layer, and the silicon thin-film layer at a bottom layer are an SOI (Silicon on Insulator) wafer substrate, a buried oxide layer, and a surface silicon layer, respectively.

9. The light control element according to claim 1, wherein at least one layer of the three or more silicon thin-film layers is polysilicon.

10. The light control element according to claim 1, wherein the second dielectric layer is any one film of silicon oxide ($SiO_2$), silicon nitride (SiN), silicon oxynitride (SiON), hafnium oxide ($HfO_2$), hafnium silicate (HfSiO), zirconium oxide ($ZrO_2$) and lanthanum oxide ($La_2O_3$), or a composite film of the same.

11. An optical waveguide circuit constituting a Mach-Zehnder interferometer, comprising:

a phase modulation waveguide having the light control element according to claim 1;

a branching waveguide optically coupled to the phase modulation waveguide;

an input waveguide optically coupled to the phase modulation waveguide through the branching waveguide;

a merging waveguide optically coupled to the phase modulation waveguide; and an output waveguide optically coupled to the phase modulation waveguide through the merging waveguide.

12. An optical waveguide circuit constituting a ring resonator, comprising:

a ring waveguide having the light control element according to claim 1;

an input waveguide optically coupled to the ring waveguide; and an output waveguide optically coupled to the ring waveguide.

13. The light control element according to claim 3, wherein a width of a region where one pair of adjacent silicon thin-film layers overlap in a part where electric field strength of light is high is wider than a width of a region where another pair of adjacent silicon thin-film layers overlap.

14. A light control element comprising:

a first dielectric layer placed on a substrate;

three or more silicon thin-film layers placed on the first dielectric layer;

a second dielectric layer placed between the three or more silicon thin-film layers; and a third dielectric layer placed to surround the silicon thin-film layers and the second dielectric layer, wherein the three or more silicon thin-film layers are arranged to partially overlap with one another, the second dielectric layer is arranged between the silicon thin-film layers in a part where the silicon thin-film layers overlap, in the three or more silicon thin-film layers, the silicon thin-film layers adjacent to each other have different conductivity types, and of the three or more silicon thin-film layers, a doping concentration of a silicon thin-film layer in a part where electric field strength of light is high is lower than a doping concentration of a silicon thin-film layer in another part.

15. The light control element according to claim 14, wherein a width of a region where one pair of adjacent silicon thin-film layers overlap in a part where electric field strength of light is high is wider than a width of a region where another pair of adjacent silicon thin-film layers overlap.

16. An optical waveguide circuit constituting a Mach-Zehnder interferometer, comprising:

a phase modulation waveguide having the light control element according to claim 14;

a branching waveguide optically coupled to the phase modulation waveguide;

an input waveguide optically coupled to the phase modulation waveguide through the branching waveguide;

a merging waveguide optically coupled to the phase modulation waveguide; and an output waveguide optically coupled to the phase modulation waveguide through the merging waveguide.

17. An optical waveguide circuit constituting a ring resonator, comprising:

a ring waveguide having the light control element according to claim 14;

an input waveguide optically coupled to the ring waveguide; and an output waveguide optically coupled to the ring waveguide.

18. A light control element comprising:

a first dielectric layer placed on a substrate;

three or more silicon thin-film layers placed on the first dielectric layer;

a second dielectric layer placed between the three or more silicon thin-film layers; and a third dielectric layer placed to surround the silicon thin-film layers and the second dielectric layer, wherein the three or more silicon thin-film layers are arranged to partially overlap with one another, the second dielectric layer is arranged between the silicon thin-film layers in a part where the silicon thin-film layers overlap, in the three or more silicon thin-film layers, the silicon thin-film layers adjacent to each other have different conductivity types, and a width of a region where one pair of adjacent silicon thin-film layers overlap in a part where electric field strength of light is high is wider than a width of a region where another pair of adjacent silicon thin-film layers overlap.

19. An optical waveguide circuit constituting a Mach-Zehnder interferometer, comprising:

a phase modulation waveguide having the light control element according to claim 18;

a branching waveguide optically coupled to the phase modulation waveguide;

an input waveguide optically coupled to the phase modulation waveguide through the branching waveguide;

a merging waveguide optically coupled to the phase modulation waveguide; and an output waveguide optically coupled to the phase modulation waveguide through the merging waveguide.

20. An optical waveguide circuit constituting a ring resonator, comprising:

a ring waveguide having the light control element according to claim 18;

an input waveguide optically coupled to the ring waveguide; and an output waveguide optically coupled to the ring waveguide.

* * * * *